United States Patent
Okada et al.

(10) Patent No.: US 9,067,799 B2
(45) Date of Patent: Jun. 30, 2015

(54) ACICULAR STRONTIUM CARBONATE FINE POWDER TREATED WITH A COMBINATION OF COMPOUNDS CONTAINING A POLYOXYALKYLENE GROUP

(71) Applicant: Ube Material Industries, Ltd., Ube-shi, Yamaguchi (JP)

(72) Inventors: Fumio Okada, Ube (JP); Takeshi Himoto, Ube (JP); Rika Nogita, Ube (JP); Kouichi Fukuda, Ube (JP)

(73) Assignee: UBE MATERIAL INDUSTRIES, LTD., Ube-shi, Yamaguchi (JP)

( * ) Notice: Subject to any disclaimer, the term of this patent is extended or adjusted under 35 U.S.C. 154(b) by 120 days.

(21) Appl. No.: 14/040,822

(22) Filed: Sep. 30, 2013

(65) Prior Publication Data

US 2014/0093735 A1    Apr. 3, 2014

(30) Foreign Application Priority Data

Sep. 28, 2012    (JP) .................................. 2012-217632

(51) Int. Cl.
*B32B 5/16* (2006.01)
*B05D 7/00* (2006.01)
*C01F 11/18* (2006.01)

(52) U.S. Cl.
CPC ......... *C01F 11/187* (2013.01); *Y10T 428/2982* (2015.01); *Y10T 428/2998* (2015.01); *Y10T 428/2991* (2015.01)

(58) Field of Classification Search
CPC .................... Y10T 428/2991; Y10T 428/2998
USPC .......................... 428/403–407; 427/220, 221
See application file for complete search history.

(56) References Cited

U.S. PATENT DOCUMENTS

| | | | | |
|---|---|---|---|---|
| 3,833,502 | A * | 9/1974 | Leary et al. .................... | 508/507 |
| 6,165,256 | A * | 12/2000 | Hayakawa et al. ............. | 106/13 |
| 8,388,749 | B2 * | 3/2013 | Okada et al. .................. | 106/463 |
| 2007/0254982 | A1 * | 11/2007 | Kohler et al. .................. | 523/200 |
| 2010/0040885 | A1 * | 2/2010 | Ichimura et al. ............... | 428/407 |
| 2010/0055460 | A1 * | 3/2010 | Ichimura et al. ............... | 428/402 |
| 2012/0214927 | A1 * | 8/2012 | Okada et al. .................. | 524/424 |

FOREIGN PATENT DOCUMENTS

| | | |
|---|---|---|
| JP | 2004-035347 | 2/2004 |
| JP | 2008-101051 | 5/2008 |
| JP | 2008-222496 | 9/2008 |
| WO | WO 2012/111692 A1 | 8/2012 |

* cited by examiner

*Primary Examiner* — Holly Le
(74) *Attorney, Agent, or Firm* — Nixon Peabody LLP; Jeffrey L. Costellia

(57) ABSTRACT

An acicular strontium carbonate fine powder having a mean length of 150 nm or less and a mean aspect ratio of 1.5 or more and containing acicular strontium carbonate particles having a length of 200 nm or more in an amount of 5% or less in terms of number of acicular particles is improved in its dispersibility in hydrophobic organic solvent by treating the acicular strontium carbonate fine powder with a combination of polycarboxylic acid having a side chain of a polyoxyalkylene group or its anhydride and amine having a polyoxyalkylene group and a hydrocarbyl group.

9 Claims, No Drawings

ACICULAR STRONTIUM CARBONATE FINE POWDER TREATED WITH A COMBINATION OF COMPOUNDS CONTAINING A POLYOXYALKYLENE GROUP

FIELD OF THE INVENTION

The present invention relates to an acicular strontium carbonate fine powder and a process for producing the same.

BACKGROUND OF THE INVENTION

It is known that articles of resin composition manufactured under stress applied to specific directions show birefringence. For instance, a film manufactured by way of stretching a casted film generally shows birefringence. Optical articles such as an optical lens manufactured by injection also show birefringence.

JP 2004-35347 A describes an article of resin composition which is free from birefringence, can be manufactured using a resin composition containing an acicular strontium carbonate powder. For example, a film of a resin composition containing the acicular strontium carbonate powder which is manufactured by stretching a casted resin film containing the acicular strontium carbonate particles is made essentially free from birefringence, because the birefringence shown by the stretching of the film is cancelled by birefringence provided by the acicular strontium carbonate particles aligned in the stretching direction.

In most cases, the optical articles such as optical film are required to have high transparency. The incorporation of the acicular strontium carbonate particles in the film may disturb the transparency of the film. In this connection, JP 2004-35347 A describes the transparency of articles such as a film is essentially not disturbed if the length of the incorporated acicular strontium carbonate particles is not larger than 200 nm.

As for the manufacture of a film containing acicular strontium carbonate powder therein which is essentially free from birefringence, JP 2004-35347 A describes the procedures in which an acicular strontium carbonate powder is dispersed in tetrahydrofuran to prepare a dispersion, subsequently a resinous material is dissolved in the dispersion to give a transparent polymer solution containing the acicular strontium carbonate powder, coating the polymer solution over a glass plate, evaporating the tetrahydrofuran from the coated solution to prepare a film, and the film is separated from the glass plate and stretched.

In the above-mentioned procedures for manufacturing the birefringence-free film, it is required that the acicular strontium carbonate powder is well dispersed in the tetrahydrofuran whereby the powder is uniformly dispersed in the stretched film.

As is apparent from the descriptions of JP 2004-35347 A, the acicular strontium carbonate powder should be well dispersed in a hydrophobic organic solvent in which the polymer is dissolved. It is known that fine particles of inorganic material easily aggregate in a hydrophobic organic solvent due to van der Waals force. Therefore, fine acicular strontium carbonate particles having a less size are tend to aggregate in a hydrophobic organic solvent more easily.

JP 2008-101051 A describes that carbonate particles are treated in a hydrophilic solvent with a treating agent containing a carboxylic group, and the thus treated carbonate particles are dispersed in a disperser in the presence of a dispersing agent. For instance, in the working examples, a calcium carbonate powder is dispersed first in ethanol containing a surface-treating agent, the resulting dispersion is then subjected to dispersing procedure, and the thus obtained dispersion is mixed with a polymer dissolved in a hydrophobic methylene chloride.

Thus, JP 2008-101051 A describes preparation of a dispersion of carbonate powder in a polymer solution which comprises the step of once dispersing the carbonate powder in a hydrophilic solvent such as ethanol, and fails to describe preparation of a dispersion of carbonate powder by directly dispersing the carbonate powder in a polymer solution, that is, a hydrophobic polymer solution.

WO 2012/111692 describes that dispersability of an alkaline earth metal carbonate micropowder in a polymer resin or in an organic solvent is improved by treating the surface of the alkaline earth metal carbonate micropowder with a surfactant having a hydrophilic group and a hydrophobic group and a group that forms an anion in water, for instance, a surfactant comprising a carboxyl group, a linking polyoxyethylene and an alkyl group. In the working examples, it is shown that a strontium carbonate fine powder treated with the surfactant is well dispersed in methylene chloride.

JP 2008-222496 A describes that a strontium carbonate fine powder can be made well dispersible in an aqueous medium by treating the powder with a polymer comprising a polycarboxylic acid (or anhydride thereof) having a side chain of polyoxyalkylene group.

SUMMARY OF THE INVENTION

As is described in the above-mentioned JP 2004-35347 A, the acicular strontium carbonate fine powder should have a length of not more than 200 nm, if the acicular strontium carbonate fine powder is incorporated into a resin material for the use as an optical article.

The inventors of the present invention have studied dispersibility of acicular strontium carbonate powder in hydrophobic organic solvents such as methylene chloride and found that the acicular strontium carbonate powder having a mean length of not larger than 200 nm which is not treated with a surface-treating agent is apt to aggregate in the hydrophobic organic solvents and is hardly dispersed uniformly in the hydrophobic organic solvents. They have further found that acicular strontium carbonate powder having a mean length of not larger than 200 nm which is treated with a surfactant having a hydrophilic group and a hydrophobic group and a group that forms an anion (as disclosed in WO 2012/111692) is still apt to aggregate in the hydrophobic organic solvents and is hardly dispersed uniformly in the hydrophobic organic solvents.

Accordingly, an object of the invention is to provide an acicular strontium carbonate powder that has a mean length of not larger than 200 nm and is well dispersed in hydrophobic organic solvents.

As a result of the studies by the inventors, it has been found that dispersibility of an acicular strontium carbonate powder having a mean length of not larger than 200 nm in hydrophobic organic solvents is prominently improved if the powder is pre-treated with a combination of specific surface active agents, that is, a combination of polycarboxylic acid having a side chain of a polyoxyalkylene group or anhydride thereof and amine having a polyoxyalkylene group and a hydrocarbyl group.

Accordingly, from one aspect, the invention provides an acicular strontium carbonate fine powder having a mean length of 150 nm or less and a mean aspect ratio of 1.5 or more, preferably 2 or more, and containing acicular strontium carbonate particles having a length of 200 nm or more in an amount of 5% or less in terms of number of acicular particles, wherein the acicular strontium carbonate fine powder has been treated with a combination of polycarboxylic acid having a side chain of a polyoxyalkylene group or anhydride thereof and amine having a polyoxyalkylene group and a hydrocarbyl group.

From another aspect, the invention provides a process for producing the above-mentioned acicular strontium carbonate fine powder which comprises the steps of:

preparing an aqueous slurry which contains acicular strontium carbonate particles dispersed therein, the acicular strontium carbonate particles having a mean length of 150 nm or less and a mean aspect ratio of 1.5 or more, preferably 2 or more, and containing acicular strontium carbonate particles having a length of 200 nm or more in an amount of 5% or less in terms of number of acicular particles;

combining the aqueous slurry with polycarboxylic acid having a side chain of a polyoxyalkylene group or anhydride thereof, whereby obtaining an aqueous slurry of the acicular strontium carbonate particles treated with the polycarboxylic acid or anhydride thereof;

subsequently combining the aqueous slurry of the treated acicular strontium carbonate particles with amine having a polyoxyalkylene group and a hydrocarbyl group, whereby obtaining an aqueous slurry of twice treated acicular strontium carbonate particles; and subsequently drying the aqueous slurry of twice treated acicular strontium carbonate particles.

Preferred embodiments of the invention are described below.

(1) The amine has an HLB in the range of 4 to 10.

(2) The amine is polyoxyethylene-stearylamine.

(3) The acicular strontium carbonate fine powder has a mean aspect ratio is not less than 2, more specifically not less than 2.0, but not more than 5, more specifically not more than 5.0.

(4) The acicular strontium carbonate fine powder has a mean length of 10 nm or more.

(5) The amine is used in an amount of 1.1 to 5.0 weight parts per one weight part of the polycarboxylic acid or anhydride thereof.

The acicular strontium carbonate fine powder of the invention has a mean length of 150 nm or less and a mean aspect ratio of 1.5 or more, preferably 2 or more, and containing acicular strontium carbonate particles having a length of 200 nm or more in an amount of 5% or less in terms of number of acicular particles. Nevertheless, the acicular strontium carbonate fine powder of the invention can be well dispersed in hydrophobic organic solvents which are generally employed for preparing polymer solutions. Therefore, the acicular strontium carbonate fine powder of the invention is favorably employable for the incorporation into articles of polymer material which are used as optical elements.

DETAILED DESCRIPTION OF THE INVENTION

The acicular strontium carbonate powder comprising acicular strontium carbonate particles which is employable for the invention has a mean length of 150 nm or less, preferably 130 nm or less, more preferably 100 nm or less, also preferably 10 nm or more, more preferably 30 nm or more, most preferably 50 nm or more, and a mean aspect ratio of 1.5 or more, preferably 2 or more, more preferably 2.2 or more, also preferably 5 or less, more preferably 4 or less, and containing acicular strontium carbonate particles having a length of 200 nm or more in an amount of 5% or less, preferably 3% or less, more preferably 1% or less, in terms of number of acicular particles. The length and aspect ratio of the acicular strontium carbonate powder can be determined by the known method of analyzing a microscopic image of the powder.

The acicular strontium carbonate fine powder of the invention is characterized in that the surface of the powder comprising the acicular particles are treated with a combination of polycarboxylic acid having a side chain of a polyoxyalkylene group or anhydride thereof and amine having a polyoxyalkylene group and a hydrocarbyl group. It can be confirmed from the IR spectrum of Fourier transform infrared spectroscopy (FT-IR) that these compounds are placed on the surface of the strontium carbonate powder.

It has been not known why the acicular strontium carbonate fine powder treated with the combination of these compounds is well dispersible in a hydrophobic organic solvent. However, the inventors assume as follows: When the acicular powder is treated with the combination of polycarboxylic acid having a side chain of a polyoxyalkylene group or anhydride thereof and amine having a polyoxyalkylene group and a hydrocarbyl group, the polycarboxylic acid or anhydride thereof is predominantly attached to the acicular particles via its carboxyl group. Thereafter, the amine is chemically or physically connected to the side chain of a poloxyalkylene of the polycarboxylic or its anhydride with its polyoxyalkylene group to form a double surface layer on the acicular particle. The thus formed double surface layer functions to physically keep an acicular particle from other acicular particles, whereby the acicular particles hardly aggregate. Further, in the dry powder comprising the acicular particles having the double surface layer thereon, the acicular particles are kept from other acicular particles with relatively large spaces. In addition, the hydrocarbyl group of the amine is exposed on the surface of the acicular particle. It is known that the hydrocarbyl group shows good affinity for hydrophobic solvents. Due to the presence of the relatively large space between adjoining acicular particles and the presence of the hydrocarbyl group exposed on the surface of the acicular particles, when the acicular strontium carbonate powder is placed in a hydrophobic organic solvent, the hydrophobic organic solvent easily enters the spaces formed between the adjoining acicular particles, whereby the acicular strontium carbonate powder of the invention is easily dispersed in the solvent essentially without forming aggregates.

In the invention, the polycarboxylic acid having a side chain of a polyoxyalkylene group is preferably in the form of anhydride thereof. The polycarboxylic acid is commercially available from Nichiyu Co., Ltd. under trade names of Mariarim AKM-0531, Mariarim AKM-1511-60, Mariarim HKM-50A, Mariarim AKM-150A and Mariarim SC-0505K.

In the invention, the amine having a polyoxyalkylene group and a hydrocarbyl group preferably contains two polyoxyalkylene groups and one hydrocarbyl group both of which are attached to the nitrogen atom. The polyoxyalkylene group preferably is a polyoxyethylene group. The hydrocarbyl group preferably has 12-18 carbon atoms. The hydrocarbyl group may contain a double bond and/or a triple bond. The amine, which may be an amine surfactant, preferably has a HLB (Hydrophile-Lipophile Balance) in the range of 4 to 10. The HLB of the amine may be determined depending upon the polarity of the organic solvent in which the acicular strontium carbonate fine powder is dispersed. For instance, the amine preferably has a HLB of 4 to 6, if the acicular strontium carbonate powder is dispersed in a hydrophobic organic solvent having a relatively low polarity, such as cyclohexane. However, the amine preferably has a HLB of 7 to 10, if the acicular strontium carbonate powder is dispersed in a hydrophobic organic solvent having a relatively high polarity, such as methylene chloride. Examples of the amine may include polyoxyethylene-laurylamine, polyoxylethylene-stearylamine, polyoxyethylene-oleylamine, polyoxyethylene-alkyl (coconut oil)amine, and polyoxyethylene (beef tallow) alkylamine.

The acicular strontium carbonate powder of the invention can be produced, for instance, by a process comprising the steps of:

preparing an aqueous slurry which contains acicular strontium carbonate particles dispersed therein, the acicular strontium carbonate particles having a mean length of 150 nm or less and a mean aspect ratio of 1.5 or more, specifically 2 or more, and containing acicular strontium carbonate particles having a length of 200 nm or more in an amount of 5% or less in terms of number of acicular particles;

combining the aqueous slurry with polycarboxylic acid having a side chain of a polyoxyalkylene group or anhydride thereof, whereby obtaining an aqueous slurry of the acicular strontium carbonate particles treated with the polycarboxylic acid or anhydride thereof;

subsequently combining the aqueous slurry of the treated acicular strontium carbonate particles with amine having a polyoxyalkylene group and a hydrocarbyl group, whereby obtaining an aqueous slurry of twice treated acicular strontium carbonate particles; and subsequently drying the aqueous slurry of twice treated acicular strontium carbonate particles.

The aqueous slurry preferably contains the acicular strontium carbonate powder in an amount of 1 to 30 wt. %. To the aqueous slurry may be added the polycarboxylic acid (or its anhydride) in an amount of 1 to 30 weight parts, preferably 2 to 20 weight parts, per 100 weight parts of the strontium carbonate powder in the slurry. The amine may be added to the aqueous slurry in an amount of 1 to 40 weight parts, preferably in an amount of 3 to 30 weight parts per 100 parts of the strontium carbonate powder in the slurry. It is preferred that the amount of the amine is relatively large as compared with the amount of the polycarboxylic acid (or its anhydride). For instance, the amine is preferably added 1.1 to 5.0 times, more preferably 1.5 to 4.0 times, as much as the polycarboxylic acid (or its anhydride). The polycarboxylic acid (or its anhydride) and amine are preferably placed in the aqueous slurry under stirring. The amine can be preferably added to the aqueous slurry after the polycarboxylic acid (or its anhydride) is placed and dissolved in the aqueous slurry.

The aqueous slurry containing the acicular strontium carbonate powder treated with the polycarboxylic acid (or its anhydride) and amine can be subsequently dried by a known drying procedure using a spray dryer or a drum dryer.

The acicular strontium carbonate powder to be treated in the invention can be prepared by heating an aqueous dispersion of fine spherical strontium carbonate particles having a mean aspect ratio of less than 1.5 to a temperature of 60° C. or higher, preferably in the range of 70 to 100° C., so as to cause growth of the particle. The spherical strontium carbonate particles preferably has a specific surface area in the range of 20 to 180 $m^2/g$, more preferably of 40 to 150 $m^2/g$, most preferably of 60 to 150 $m^2/g$. The spherical strontium carbonate particles are not necessarily of perfect sphere, but may be oval or cubic having rounded corners.

The spherical strontium carbonate fine powder is known, as is disclosed in WO 2011/052680. The known process for preparing the spherical strontium carbonate fine powder may comprise carbonation of strontium hydroxide dissolved or dispersed in an aqueous medium by introducing gaseous carbon dioxide into the aqueous medium under stirring in the presence of an organic acid containing at least one of a hydroxyl group and at least one of a carboxyl group under the condition that the total number of these groups is 3 or more. The aqueous solution or dispersion generally contains strontium hydroxide in an amount of 1 to 20 wt. %, preferably 2 to 15 weight %, more preferably 3 to 8 wt. %. Examples of the organic acid may include tartaric acid, malic acid and gluconic acid.

The invention is further described below by the non-limiting examples.

Example 1

(1) Preparation of Aqueous Slurry of Acicular Strontium Carbonate Particles

In 3 liters of pure water (cooled to 10° C.) was placed 366 g of strontium hydroxide octhydrates (special grade, purity: >96%) under stirring to give an aqueous dispersion containing 5.6 wt. % of strontium hydroxide particles. To the strontium hydroxide dispersion was added DL-tartaric acid (special grade, purity: >99%) under stirring and the DL-tartaric acid is dissolved in the dispersion. Into the stirred strontium hydroxide dispersion (maintained at 10° C.) was incorporated gaseous carbon dioxide at a flow rate of 3.75 L/min. (corresponding to 22 mL/min. per one gram of strontium hydroxide), until the dispersion reached pH 7, whereby producing strontium carbonate particles. The dispersion containing the strontium carbonate particles was further stirred for 30 minutes, to obtain an aqueous dispersion of strontium carbonate particles. The obtained aqueous dispersion of strontium carbonate particles was then replaced in a stainless steel tank, and heated to 80° C. for 24 hours, whereby causing growth of the strontium carbonate particles to have an acicular shape. The thus heated dispersion of strontium carbonate particles was subsequently cooled to room temperature, whereby the desired aqueous slurry of acicular strontium carbonate particles was prepared.

(2) Surface Treatment of Acicular Strontium Carbonate Particles

In a homo-mixer (T.K. Homomixer Mark II, available from Prymix Co., Ltd.) was placed 3,500 g of the aqueous slurry containing 5.8 wt. % of acicular strontium carbonate particles. The aqueous slurry was stirred by means of a stirring paddle rotated at a rotation rate of 7.85 m/min. Under stirring, 12.2 g (6 weight parts per 100 weight parts of strontium carbonate particles) of a polycarboxylic anhydride having a side chain of polyoxyalkylene group (Mariarim KM-0521) was placed in the aqueous slurry and dissolved. Subsequently, 30.5 g (15 weight parts per 100 weight parts of the strontium carbonate particles) of polyoxyethylene-stearylamine (Naimean S 204, HLB=8.0, available Nichiyu Co., Ltd.) was placed in the dispersion under stirring. The thus obtained dispersion was further stirred for one hour.

The dispersion of thus treated strontium carbonate particles was subsequently dried by spraying it onto a stainless steel plate heated to 120-130° C., whereby the treated strontium carbonate fine powder was prepared.

Under microscopic observation, it was confirmed that the treated strontium carbonate fine powder was in the acicular shape. Further, the surface of the treated strontium carbonate fine powder was observed by means of FT-IR (one-time reflection ATR method, diamond 45°, resolution powder 4 cm$^{-1}$), and an IR peak assigned to the polycarboxylic acid having a side chain of polyoxyalkylene group as well as an IR peak assigned to the polyoxyethylene-stearylamine were detected.

(3) Determination of Particle Size and BET Specific Surface Area of the Surface Treated Acicular Strontium Carbonate Powder From the microscopic image, 1,000 particles of the acicular strontium carbonate powder were selected and determined in their lengths and aspect ratios. Thereafter, the mean length and mean aspect ratio of the acicular particles and a ratio of number of acicular particles having a length of 200 nm or more per total number were determined.

It was determined that the mean length was 64 nm, the mean aspect ratio was 2.7, and a ratio of number of acicular particles having a length of 200 nm or more per total number was less than 0.1% (0/1000). It was also determined that the treated acicular strontium carbonate had a BET specific surface area of 74.0 m$^2$/g.

(4) Dispersibility of the Treated Strontium Carbonate Powder in Methylene Chloride In 20 g of methylene chloride was placed 0.2 g of the treated acicular strontium carbonate powder and subjected to a dispersing procedure by means of a ultrasonic homogenizer for 5 minutes, to prepare a dispersion containing the treated acicular strontium carbonate particles in an amount of 1 wt. %.

The particle distribution of the strontium carbonate particles in the dispersion was determined by a dynamic photo-scattering method. The determined $D_{90}$ (particle size at or below which the sizes of 90% of the particles belonged to) and the standard deviation are shown in Table 1 below.

Further, the light transmission of the dispersion of the treated acicular strontium carbonate particles was determined by means of a spectrophotometer. If the acicular particles were aggregated to form large aggregated masses, the light transmission decreased. In Table 1, the light transmissions for lights of wavelengths of 400 nm, 500 nm, 600 nm, 700 nm and 800 nm are shown.

Comparison Example 1

The procedures of Example 1 were repeated except that the acicular strontium carbonate particles were treated, in the procedure of (2), with 20.3 g (10 weight parts per 100 weight parts of the acicular strontium carbonate particles) of a surfactant having a hydrophilic group, a hydrophobic group and a group forming an anion in water (Kaocella 8110, available from Kao Corporation) in place of treatment with the combination of the polycarboxylic anhydride and amine, to obtain an acicular strontium carbonate powder treated with the surfactant.

The thus treated acicular carbonate powder was subjected to determinations of its dispersibility in methyllene chloride, and its light transmissions at various wavelengths. The data of the determinations are shown in Table 1.

TABLE 1

| | Particle distribution | | Light transmission (%) | | | | |
|---|---|---|---|---|---|---|---|
| | $D_{90}$ (nm) | Dev. (%) | 400 nm | 500 nm | 600 nm | 700 nm | 800 nm |
| Example 1 | 243.3 | 63.7 | 5.5 | 17.6 | 30.4 | 40.7 | 49.2 |
| Com. Ex. 1 | 1691 | 304.1 | 0.4 | 0.8 | 1.2 | 1.6 | 1.4 |

Remarks:
Dev. (%) is Standard Deviation in terms of %.

Comparison Example 2

The procedures of Example 1 were repeated except that the acicular strontium carbonate particles were treated, in the procedure of (2), with 12.2 g (6 weight parts per 100 weight parts of strontium carbonate particles) of a polycarboxylic anhydride having a side chain of polyoxyalkylene group (Mariarim KM-0521) alone in place of treatment with the combination of the polycarboxylic anhydride and amine, to obtain an acicular strontium carbonate powder treated with the polycarboxylic anhydride.

It was found that the thus treated acicular carbonate powder was not well dispersed in methylene chloride and precipitated to the bottom of methylene chloride.

From the results of Example 1 and Comparison Example 1 shown in Table 1 and found in Comparison Example 2, it is confirmed that the acicular strontium carbonate powder treated with a combination of the polycarboxylic acid (or its anhydride) and the amine does form aggregates in a less amount and shows improved dispersibility in methyllene chloride in comparison with the acicular strontium carbonate powder treated with the known surfactant or the polycarboxylic anhydride alone.

Example 2

The procedure of Example 1 were repeated except that the gaseous carbon dioxide was introduced into the aqueous dispersion at a flow rate of 0.5 L/min. (corresponding to 2.9 mL/min. per one gram of strontium hydroxide) and the aqueous slurry was heated to 95° C. for 12 hours in the procedure of (1), and that 12.2 g of the polycarboxylic anhydride (Mariarim KM-0521) and amount (30.5 g) of the polyoxyethylene-stearylamine were replaced with 16.24 g (8 weight parts per 100 weight parts of strontium carbonate particle) of polycarboxylic anhydride (Mariarim SC-0505K) and 46.69 g (23 weight parts per 100 weight parts of the strontium carbonate particles), respectively, in the procedure (2).

The thus treated acicular strontium carbonate powder was subjected to the determination of particle size and BET specific surface area in the manner as described in the procedure (3) of Example 1.

It was determined that the mean length was 32 nm, the mean aspect ratio was 2.3, and a ratio of number of acicular particles having a length of 200 nm or more per total number was less than 0.1% (0/1000). Further, it was determined a ratio of number of acicular particles having a length of 100 nm or more per total number was also less than 0.1% (0/1,000). It was further determined that the treated acicular strontium carbonate had a BET specific surface area of 98.0 m$^2$/g.

The particle distribution of the strontium carbonate particles in methylene chloride was determined by a dynamic photo-scattering method. The determined $D_{90}$ and $D_{50}$ as well as the standard deviation are shown in Table 2 below.

Further, the light transmission of the dispersion of the treated acicular strontium carbonate particles was determined, in the same manner. In Table 2, the light transmissions are shown.

Example 3

The procedures of Example 2 were repeated except that 46.69 g of the polyoxyethylene-stearylamine (HLB=8.0) was replaced with 48.72 g (24 weight parts per 100 weight parts of the strontium carbonate particles) of polyoxyethylene-stearylamine (HLB=5.0, Naimean 5202, available Nichiyu Co., Ltd.) in the procedure (2).

The thus treated acicular carbonate powder was subjected to determinations of its dispersibility in methyllene chloride, and its light transmissions at various wavelengths. The data of the determinations are shown in Table 2.

Comparison Example 3

The procedures of Example 2 were repeated except that the acicular strontium carbonate particles were treated, in the procedure of (2), with 48.72 g (24 weight parts per 100 weight parts of the acicular strontium carbonate particles) of a surfactant having a hydrophilic group, a hydrophobic group and a group forming an anion in water (Kaocella 8110) in place of treatment with the combination of the polycarboxylic anhydride and amine, to obtain an acicular strontium carbonate powder treated with the surfactant.

The thus treated acicular carbonate powder was subjected to determinations of its dispersibility in methyllene chloride, and its light transmissions at various wavelengths. The data of the determinations are shown in Table 2.

From the results of Examples 2 & 3 and Comparison Example 3 shown in Table 1, it is confirmed that the acicular strontium carbonate powder treated with a combination of the polycarboxylic acid (or its anhydride) and the amine does form aggregates in a less amount and shows improved dispersibility in methylene chloride in comparison with the acicular strontium carbonate powder treated with the known surfactant.

[Evaluation of Dispersibility in Cyclohexane]

The dispersibility of the acicular strontium carbonate powder prepared in Examples 2 and 3 in cyclohexane was evaluated in the manner described below.

In 20 g of cyclohexane was placed 0.2 g of the acicular strontium carbonate powder. The acicular strontium carbonate powder was then dispersed in a ultrasonic homogenizer for 5 minutes, to prepare a dispersion containing 1 wt. % of acicular strontium carbonate particles. The thus prepared dispersion was immediately placed in a glass vessel (volume: 9 mL) and allowed to stand for 15 minutes. The conditions of the dispersion was then observed.

The results of the observation is stated in Table 3.

TABLE 3

The acicular strontium carbonate powder treated in Example 2:
The dispersion was clear but a portion of
the particles was precipitated.
The acicular strontium carbonate powder treated in Example 3:
The dispersion was clear and no particles
were precipitated.

It is understood from the experimental data shown in Table 3 that the acicular strontium carbonate powder treated with polyoxyethylene-stearylamine of HLB=5 (Example 2) is more uniformly dispersed in cyclohexane than the acicular strontium carbonate powder treated with polyoxyethylene-stearylamine of HLB=8 (Example 3).

What is claimed is:

1. An acicular strontium carbonate fine powder having a mean length of 150 nm or less and a mean aspect ratio of 1.5 or more and containing acicular strontium carbonate particles having a length of 200 nm or more in an amount of 5% or less in terms of number of acicular particles, wherein the acicular strontium carbonate fine powder has been treated with a combination of polycarboxylic acid having a side chain of a polyoxyalkylene group or anhydride thereof and amine having a polyoxyalkylene group and a hydrocarbyl group.

2. The acicular strontium carbonate fine powder of claim 1, wherein the amine has an HLB in the range of 4 to 10.

3. The acicular strontium carbonate fine powder of claim 1, wherein the amine is polyoxyethylene-stearylamine.

4. The acicular strontium carbonate fine powder of claim 1, wherein the mean aspect ratio is not less than 2, but not more than 5.

TABLE 2

| | Particle distribution | | | Light transmission (%) | | | | |
|---|---|---|---|---|---|---|---|---|
| | $D_{50}$ (nm) | $D_{90}$ (nm) | Dev. | 400 nm | 500 nm | 600 nm | 700 nm | 800 nm |
| Ex. 2 | 49.8 | 87.7 | 18.9 | 22.2 | 40.5 | 54.1 | 64.2 | 71.2 |
| Ex. 3 | 61.6 | 151.3 | 37.4 | 8.0 | 21.7 | 36.2 | 47.4 | 57.3 |
| Com. 3 | 199.2 | 365.4 | 99.5 | 0.3 | 0.8 | 1.2 | 2.8 | 6.9 |

Remarks:
Dev. is Standard Deviation in terms of %.

5. The acicular strontium carbonate fine powder of claim 1, wherein the mean length is 10 nm or more.

6. A process for producing the acicular strontium carbonate fine powder of claim 1 which comprises the steps of:

preparing an aqueous slurry which contains acicular strontium carbonate particles dispersed therein, the acicular strontium carbonate particles having a mean length of 150 nm or less and a mean aspect ratio of 1.5 or more and containing acicular strontium carbonate particles having a length of 200 nm or more in an amount of 5% or less in terms of number of acicular particles;

combining the aqueous slurry with polycarboxylic acid having a side chain of a polyoxyalkylene group or anhydride thereof, whereby obtaining an aqueous slurry of the acicular strontium carbonate particles treated with the polycarboxylic acid or anhydride thereof;

subsequently combining the aqueous slurry of the treated acicular strontium carbonate particles with amine having a polyoxyalkylene group and a hydrocarbyl group, whereby obtaining an aqueous slurry of twice treated acicular strontium carbonate particles; and subsequently drying the aqueous slurry of twice treated acicular strontium carbonate particles.

7. The process of claim 6, wherein the amine has an HLB in the range of 4 to 10.

8. The process of claim 6, wherein the amine is polyoxyethylene-stearylamine.

9. The process of claim 6, wherein the amine is used in an amount of 1.1 to 5.0 weight parts per one weight part of the polycarboxylic acid or anhydride thereof.

* * * * *